US012195278B2

(12) United States Patent
Ubaldi

(10) Patent No.: US 12,195,278 B2
(45) Date of Patent: Jan. 14, 2025

(54) CONVEYOR DEVICE FOR AGRICULTURAL MACHINERY AND AGRICULTURAL MACHINERY COMPRISING SAID DEVICE

(71) Applicant: ROC S.R.L., Poggio Torriana (IT)

(72) Inventor: Raffaele Ubaldi, Santa Giustina (IT)

(73) Assignee: ROC S.R.L., Poggio Torriana (IT)

( * ) Notice: Subject to any disclaimer, the term of this patent is extended or adjusted under 35 U.S.C. 154(b) by 229 days.

(21) Appl. No.: 17/797,420

(22) PCT Filed: Feb. 5, 2021

(86) PCT No.: PCT/IB2021/050933
§ 371 (c)(1),
(2) Date: Aug. 3, 2022

(87) PCT Pub. No.: WO2021/156800
PCT Pub. Date: Aug. 12, 2021

(65) Prior Publication Data
US 2023/0096139 A1 Mar. 30, 2023

(30) Foreign Application Priority Data
Feb. 5, 2020 (IT) .................. 102020000002242

(51) Int. Cl.
*B65G 15/42* (2006.01)
*A01D 61/02* (2006.01)
(Continued)

(52) U.S. Cl.
CPC .............. *B65G 15/42* (2013.01); *A01D 61/02* (2013.01); *B65G 15/44* (2013.01); *B65G 23/44* (2013.01); *B65G 23/06* (2013.01)

(58) Field of Classification Search
CPC ........ B65G 15/42; B65G 15/44; B65G 23/44; B65G 23/06; B65G 15/52; A01D 61/02
See application file for complete search history.

(56) References Cited

U.S. PATENT DOCUMENTS

| 4,371,580 A | | 2/1983 | Morrison et al. |
| 4,553,663 A | * | 11/1985 | Johnson ................. A01D 61/02 198/848 |

(Continued)

FOREIGN PATENT DOCUMENTS

| EP | 2345321 A2 * | 7/2011 | ............. A01D 57/20 |
| EP | 3158851 A1 * | 4/2017 | ........... A01D 61/008 |

(Continued)

OTHER PUBLICATIONS

International Search Report and Written Opinion dated May 28, 2021 from counterpart International Patent Application No. PCT/IB2021/050933.

*Primary Examiner* — Gene O Crawford
*Assistant Examiner* — Abby A Jorgensen
(74) *Attorney, Agent, or Firm* — SHUTTLEWORTH & INGERSOLL, PLC; Timothy J. Klima

(57) ABSTRACT

A conveyor device includes a first axis equipped with at least two first pulleys rotating coaxially around a first rotation axis and spaced apart, a second axis provided with at least two second pulleys coaxially rotating around a second rotation axis and spaced apart, wherein each first pulley is aligned with a corresponding second pulley along a movement direction of the conveyor device. A conveyor belt extends between the first and the second axis and is wrapped around the first and second pulleys. The conveyor belt includes a substantially flat base body made of rubberized cloth and having a first face, a second face and a traction body made in one piece with its lateral zone, projecting from the first face and couplable to a first pulley and to the respective second pulley for moving the conveyor belt, and a plurality of cross bars extending transversely to the movement direction between the lateral zones.

12 Claims, 9 Drawing Sheets

(51) Int. Cl.
  *B65G 15/44*  (2006.01)
  *B65G 23/06*  (2006.01)
  *B65G 23/44*  (2006.01)

(56) References Cited

U.S. PATENT DOCUMENTS

| | | | |
|---|---|---|---|
| 7,472,533 B2 | 1/2009 | Talbot et al. | |
| 8,596,447 B2 * | 12/2013 | Gentz | B65G 15/52 |
| | | | 198/731 |
| 9,642,310 B2 * | 5/2017 | Ubaldi | A01D 89/008 |
| 2004/0231965 A1 * | 11/2004 | Dow | B65G 39/02 |
| | | | 198/813 |
| 2018/0027733 A1 * | 2/2018 | Ravaglia | A01D 84/00 |

FOREIGN PATENT DOCUMENTS

| | | | | |
|---|---|---|---|---|
| EP | 3278656 A1 * | 2/2018 | | A01D 43/02 |
| WO | WO-2007090149 A2 * | 8/2007 | | B65G 15/32 |
| WO | WO-2007092776 A2 * | 8/2007 | | B65G 15/64 |

* cited by examiner

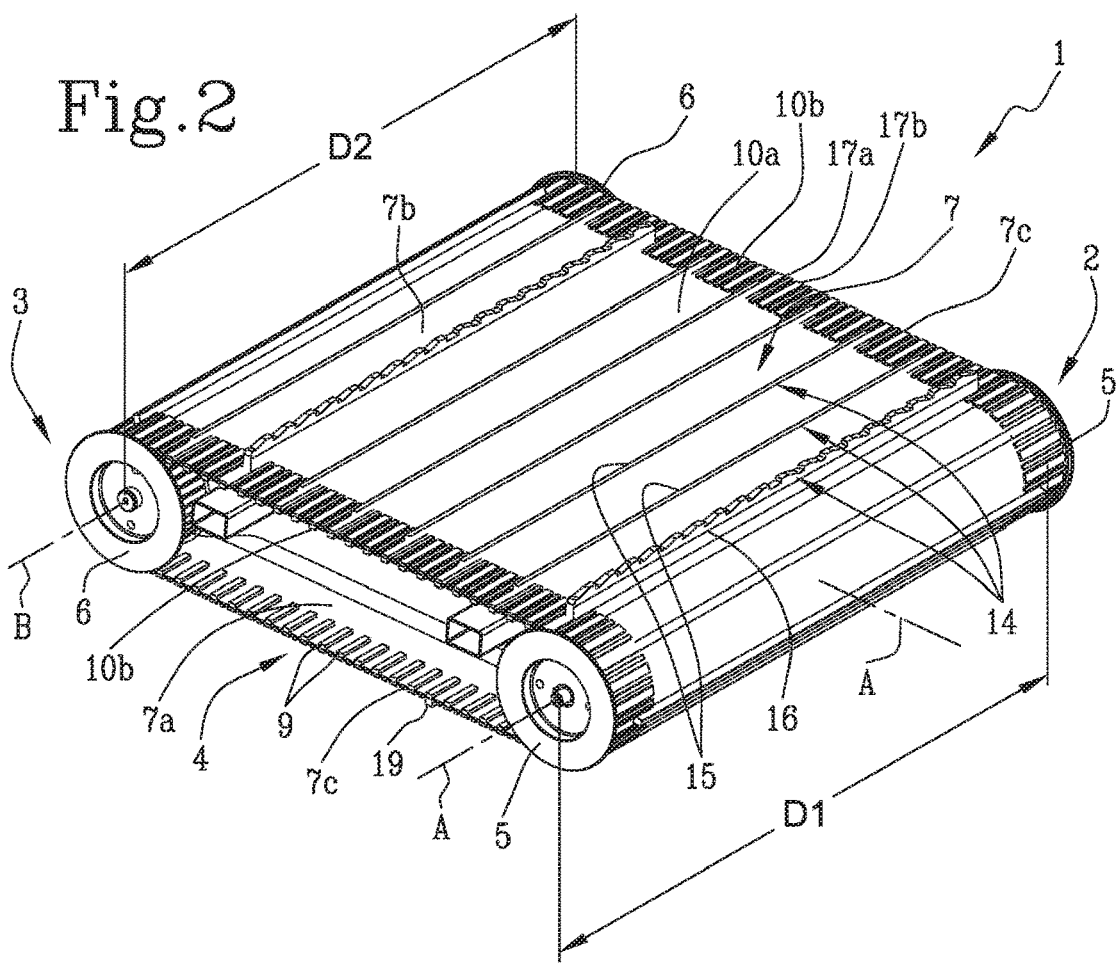
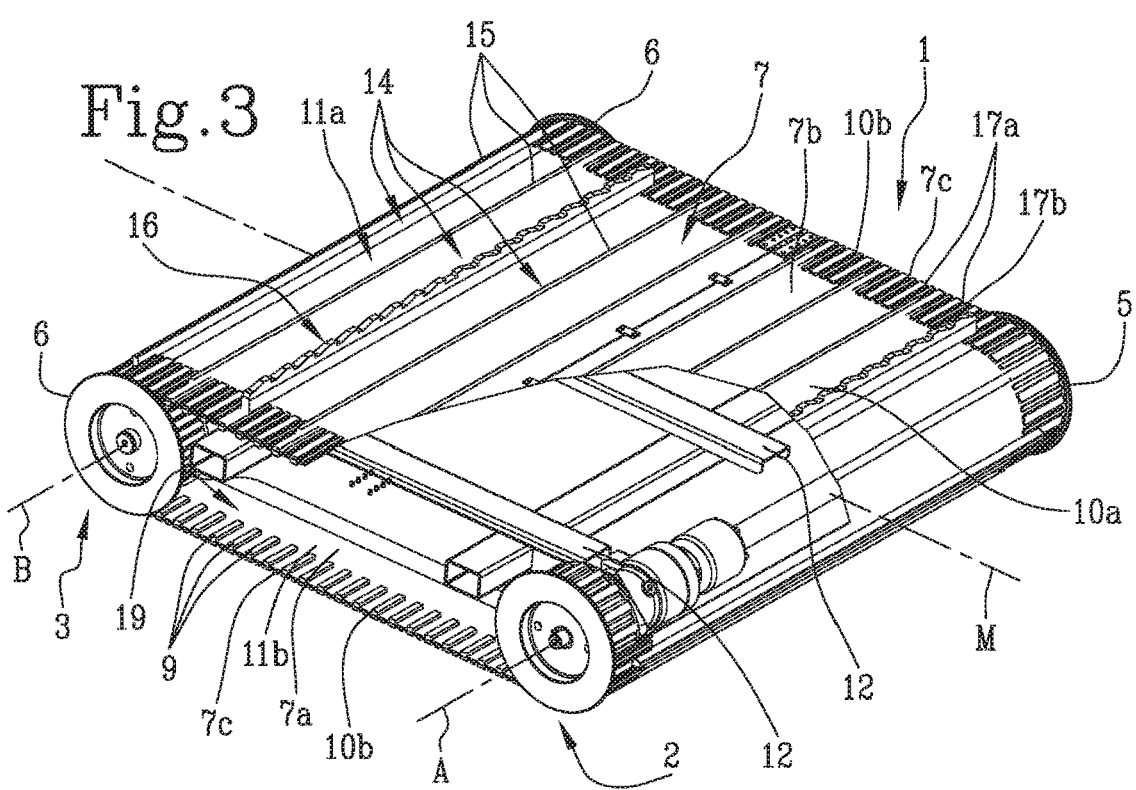

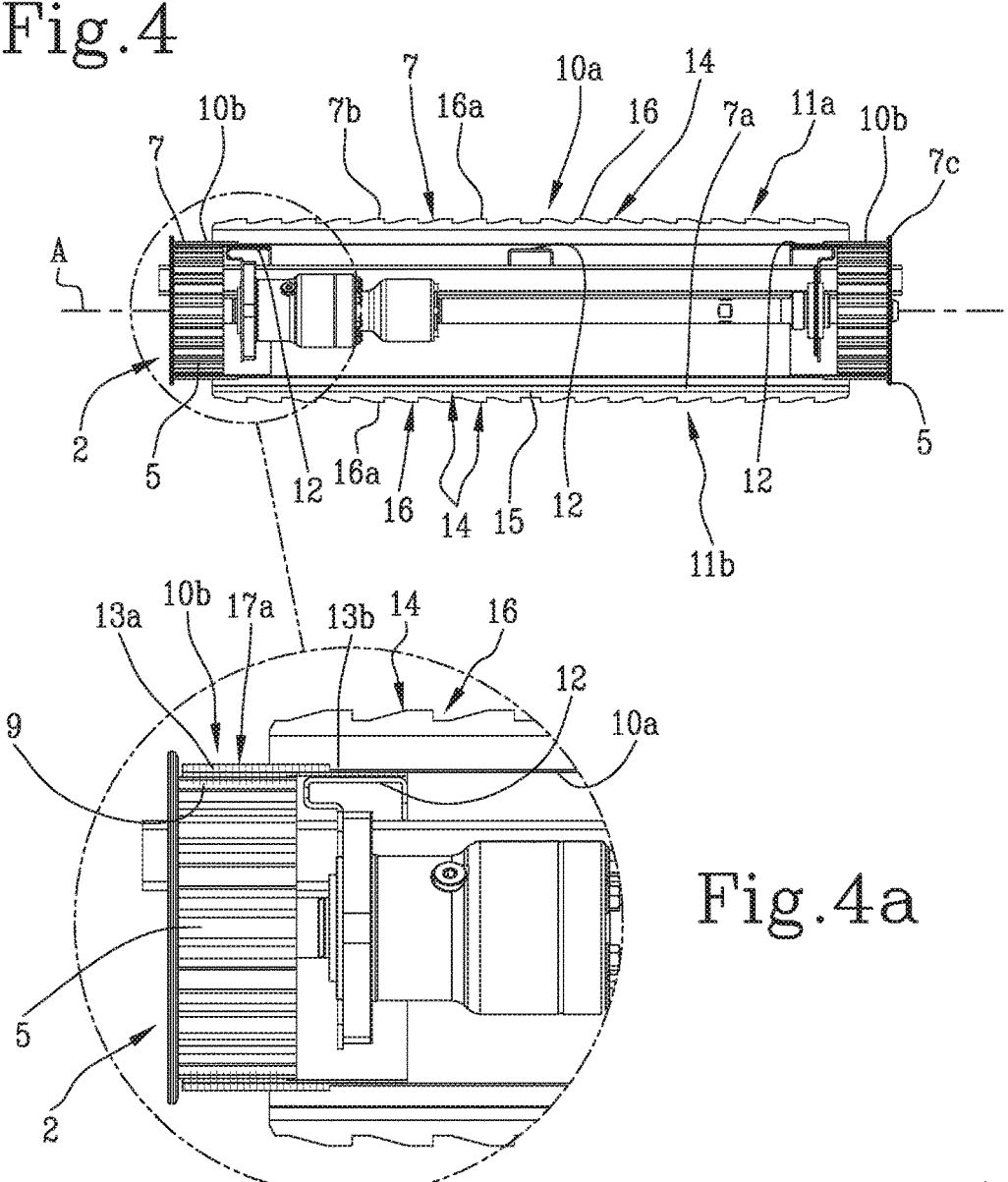
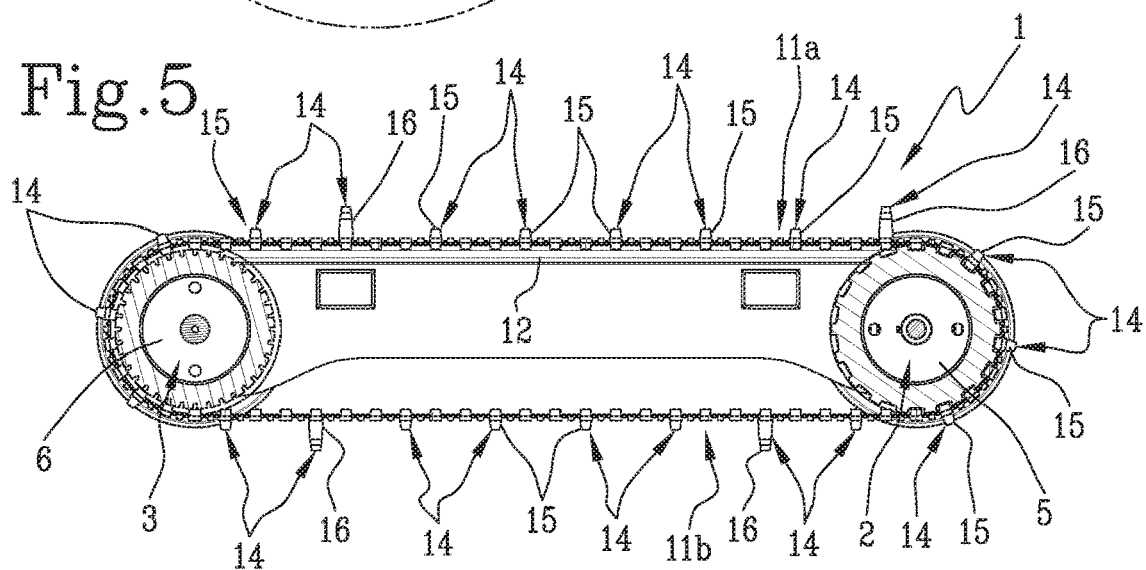

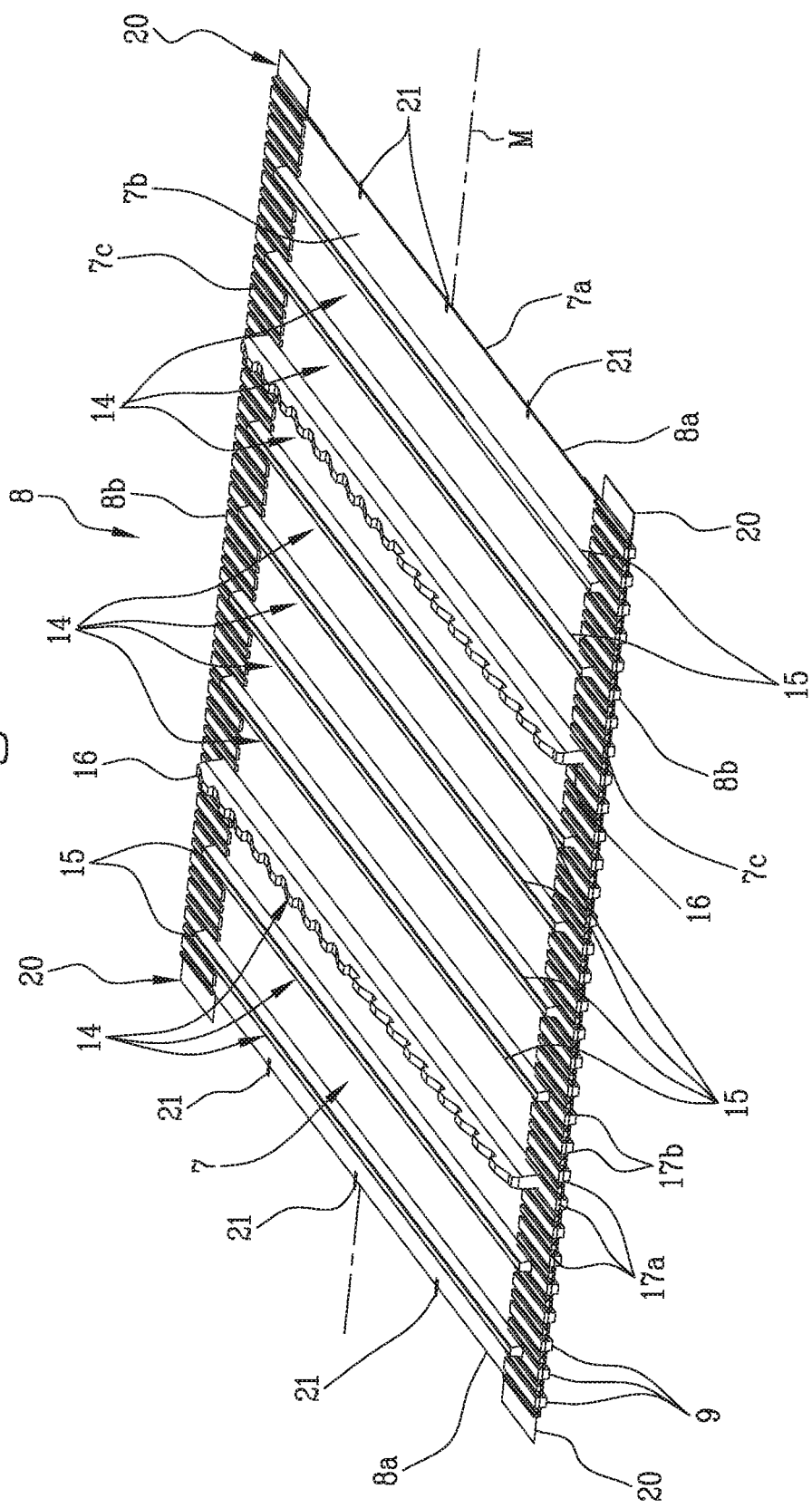

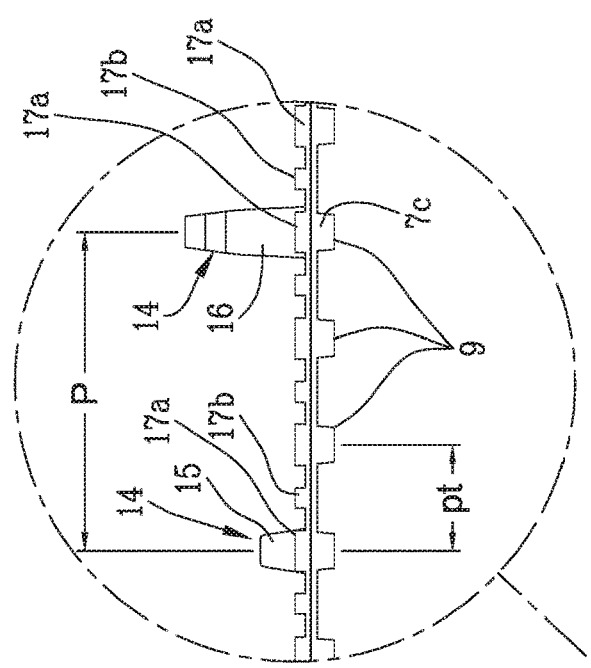
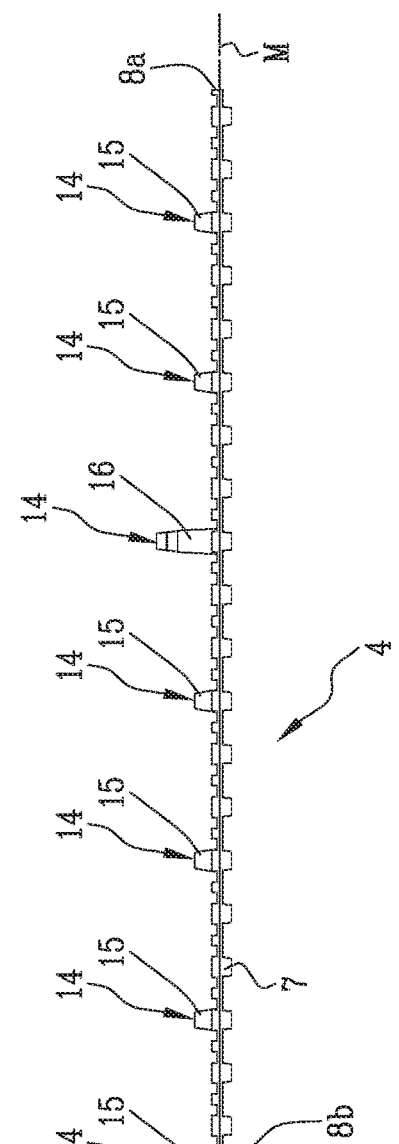

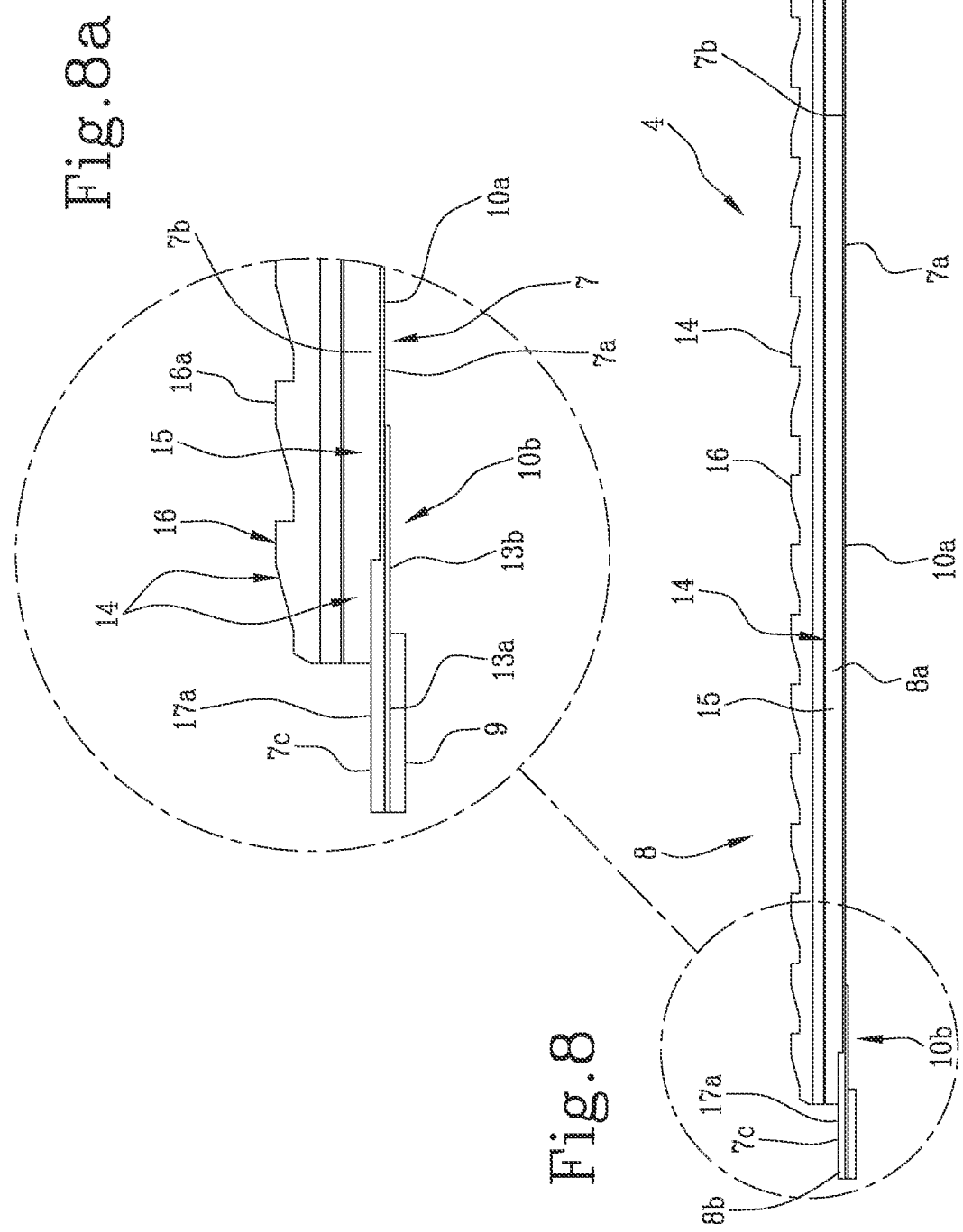

Fig.11
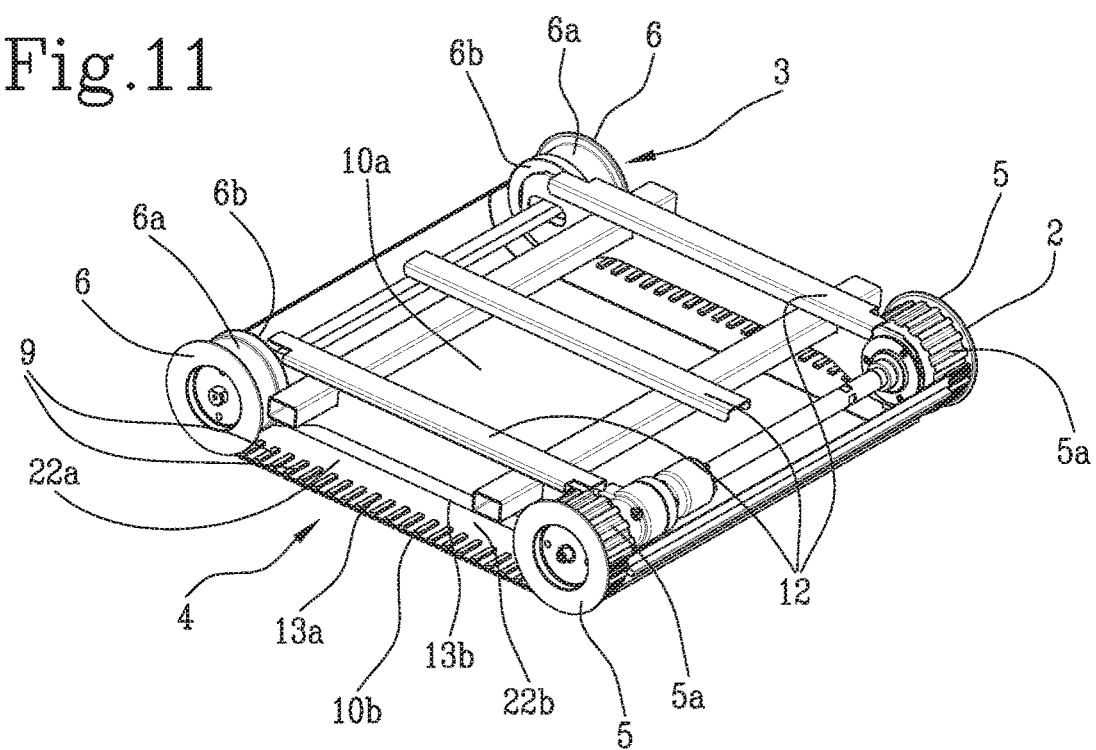
Fig.12
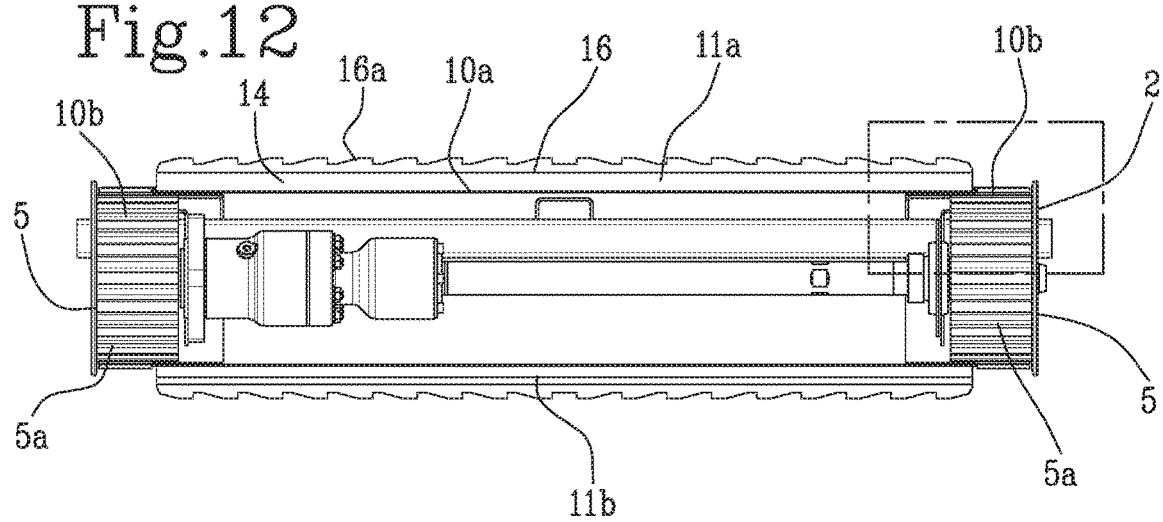
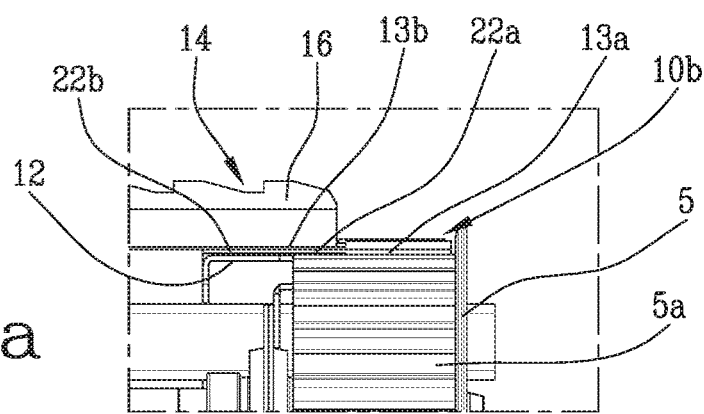
Fig.12a

CONVEYOR DEVICE FOR AGRICULTURAL MACHINERY AND AGRICULTURAL MACHINERY COMPRISING SAID DEVICE

This application is the National Phase of International Application PCT/IB2021/050933 filed Feb. 5, 2021 which designated the U.S.

This application claims priority to Italian Patent Application No. 102020000002242 filed Feb. 5, 2020, which application is incorporated by reference herein.

The present invention relates to a conveyor device and to agricultural machinery comprising said device.

Therefore, the present invention finds its main application in the moving/handling sector, and in particular in the production of handling systems for agricultural machinery.

In this sector, product handling systems are often used to convey freshly harvested agricultural products into specific machinery or to unload them in predetermined areas where they must then be collected or processed again.

Examples of such applications are swathers, that is agricultural machinery that collects already cut/mowed agricultural products from the field and arranges them in orderly rows, called swaths, in order to favour drying and facilitate collection thereof.

In the prior art, this machinery is equipped with both pick-up members and conveyor devices operatively arranged downstream of the collection members and generally oriented so as to move the products transversely to the direction of movement and collection.

Conveyor devices are usually of two types, i.e., belt or screw conveyors.

In this text, the focus will be on belt-type devices, since screw devices are now rarely utilized due to their cost and their poor flexibility.

On the other hand, belt conveyor devices are more widely used for their flexibility and lightness, which facilitate their positioning in the machinery.

A first example of a currently known solution is contained in patent publications U.S. Pat. Nos. 4,371,580 and 7,472,533, which illustrate (modular and non-modular) conveyor belts running between two rollers which put them in traction.

In at least one case, the belt is of the modular type and has a plurality of cross bars which are partly used to constrain the modules together.

Disadvantageously, the use of a roller handling system entails some technical drawbacks, especially in terms of adherence, guiding and cleaning, which in the agricultural sector is often a critical factor for the functionality and reliability of the machinery.

In fact, the need to leave the belt in traction involves a complication in the design process, and sometimes results in a reduced operating efficiency due to accidental slipping.

In order to overcome these problems, the Applicant has long been using a pulley conveyor device, in which two pairs of pulleys move respective toothed belts to which both the individual belt modules and the stiffening cross bars are bolted.

This obviates the need for a system with high tension/pull but introduces a large number of components and screws/rivets which, over time, can deteriorate, adversely affecting the reliability of the device.

The object of the present invention is therefore to provide a conveyor device and agricultural machinery, which overcome the above-mentioned drawbacks of the prior art.

In particular, it is an object of the present invention to provide a conveyor device which is low-cost and reliable at the same time.

Moreover, it is an object of the present invention to provide a conveyor device which is light but still ensures high structural stiffness.

Another object of the present invention is also to provide agricultural machinery equipped with a highly efficient and inexpensive handling/unloading system.

Said objects are achieved by means of a conveyor device having the features as claimed in one or more of the following claims from 1 to 9, as well as by means of agricultural machinery having the features as claimed in claim 10.

In particular, the conveyor device comprises a conveyor belt continuously movable between two rotation axes.

A first axis is preferably provided with at least two first pulleys rotating coaxially around a first rotation axis.

Said first pulleys are spaced apart along said first rotation axis by a first distance (preferably equal to a width of the belt).

A second axis is preferably provided with at least two second pulleys rotating coaxially around a second rotation axis.

Said second pulleys are spaced apart along said second rotation axis by a second distance. The first and second distances are equal to each other.

Each first pulley is aligned with a corresponding second pulley along a direction of movement of the conveyor device.

The conveyor device further comprises a conveyor belt extending between said first and second axes and wrapped at least around said first and second pulleys.

The conveyor belt is therefore moved by the pulleys along a direction of movement determined by the direction of rotation of the same.

Preferably, the conveyor belt is continuously movable between a transport section, upper in use, and a return section, lower in use.

According to the invention, the conveyor belt comprises a substantially flat base body preferably made of rubberized cloth and having a first face, inner in use, and a second face, outer in use.

This base body extends longitudinally along the direction of movement (wrapped around the first and second axes) and is provided with two lateral sides. The lateral sides delimit the base body transversely, preferably orthogonally to the direction of movement.

Preferably, the base body comprises a support central zone extending along the direction of movement and interposed between two traction lateral zones. The lateral zones are therefore adjacent to (and delimited by) lateral sides.

Preferably, the central zone has a smaller thickness than the two lateral zones.

According to one aspect of the invention, at least one lateral zone comprises at least one traction body projecting from said first face and couplable to a first pulley and to the respective second pulley for moving the conveyor belt.

Preferably, both lateral zones comprise a respective traction body.

The traction body is made in one piece with (preferably vulcanized to) the respective lateral zone.

Advantageously, the entire section of the conveyor belt is made in one piece, with the lateral zones engaging the pulleys, subjected to traction and guided therein by the traction body, and the central zone solely assigned to support the material.

Preferably, the traction body of at least one lateral zone is defined by a plurality of teeth made in one piece with the base body.

Said teeth project from said first (inner) face and are arranged in succession along the direction of movement in order to engage at least a first pulley and the respective second pulley.

In other words, the traction body preferably defines a toothed belt made in one piece with (preferably vulcanized to) the base body.

Preferably, the traction body of the other lateral zone also comprises a plurality of teeth arranged in succession along both lateral sides, so as to engage both the first pulleys and the respective second pulleys.

Therefore, the plurality of teeth preferably defines two lateral belts vulcanized to the respective lateral zone and provided with respective rows/successions of teeth projecting from the first face and aligned with respective grooves of the pulleys.

Alternatively, however, the base body could comprise a single toothed belt at one lateral zone, with the other lateral zone moved solely by friction by the respective pulleys.

Moreover, the conveyor belt comprises a plurality of cross bars extending transversely to said direction of movement between the lateral zones (in particular from one to the other).

Preferably, the cross bars project from the second face of the base body.

Advantageously, in this way, the conveyor belt also integrates the teeth that allow the use of a pulley handling system inside the same base body yet at the same time being reliable and light.

Preferably, it should be noted that the first and second pulleys have respective diameters (preferably equal to each other) and said cross bars are spaced apart along the direction of movement by a predetermined distance "p".

More preferably, the distance "p" is quantitatively less than or equal to $2/3\pi\,(d/2)$, wherein "d" corresponds to the smaller diameter of the first and second pulleys.

Advantageously, in this way, it is ensured that at least two cross bars are located in the belt region "engaging" the pulley, preventing bulges or depressions thereof.

Preferably, the conveyor device comprises at least one longitudinal guide extending along said movement direction and facing the first face of the base body at said first section.

Advantageously, therefore, the guide provides longitudinal support to the belt during movement in the transport section.

More preferably, the device comprises at least two longitudinal guides facing the first face of the base body at said lateral zones.

In this regard, each lateral zone preferably has an external resistant band (i.e., adjacent to the lateral side) where the traction body is located, and a sliding band, which is internal and is slidingly joined to the respective longitudinal guide when in the transport section.

These and other features and the inherent advantages will become more apparent from the following illustrative, therefore nonlimiting, description of a preferred, thus not exclusive, embodiment of a conveyor device and agricultural machinery as shown in the accompanying drawings, wherein:

FIG. 2 shows a schematic perspective view of the conveyor device according to the present invention;

FIG. 3 shows the view of FIG. 2, with some parts removed to highlight others;

FIG. 4 shows a cross-sectional view of the device in FIG. 2;

FIG. 4a shows a detail of FIG. 4;

FIG. 5 shows a side view of the device in FIG. 2;

FIG. 6 shows a top perspective view of a component of a conveyor device according to a variant of the present invention;

FIGS. 7 and 7a show a side view and a detail of the component in FIG. 6;

FIGS. 8 and 8a show a front view and a detail of the component in FIG. 6;

FIG. 11 shows a top perspective view of the device in FIG. 10a, with some parts removed to highlight others;

FIG. 12 shows a cross-sectional view of the device in FIG. 10a;

FIG. 12a shows a detail of FIG. 12.

Figure 1:
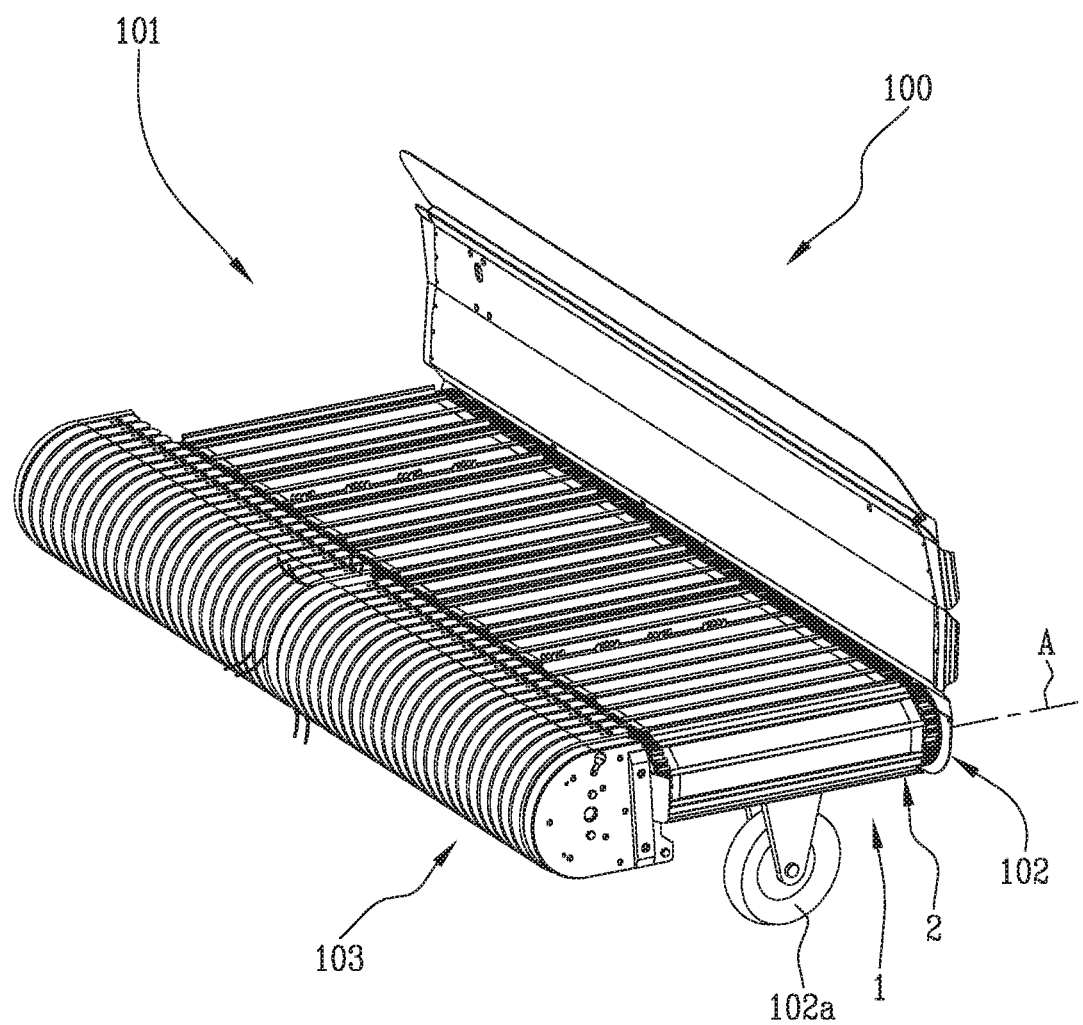
FIG. 1 shows a perspective view of agricultural machinery provided with a conveyor device according to the present invention.
Figure 9:
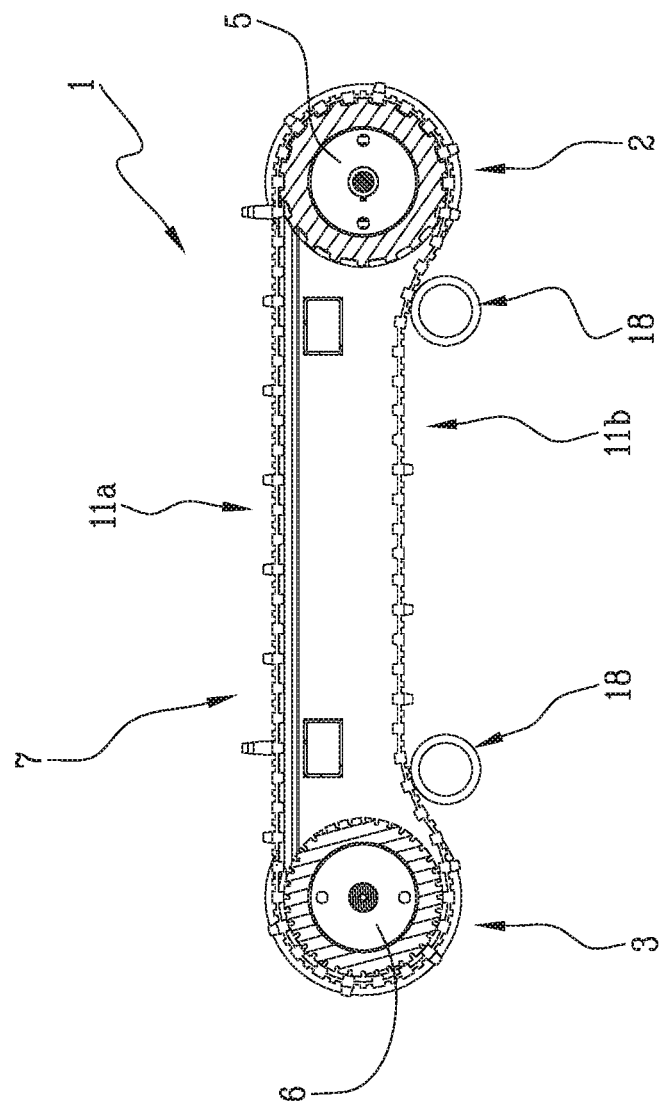
FIG. 9 shows a variant of a conveyor device according to the present invention.

With reference to the accompanying figures, the numeral 1 indicates a conveyor device according to the present invention.

The conveyor device 1 is therefore a belt-type product handling device configured to move the products on its own upper (i.e., exposed) surface by translation of the belt, which is controlled by a handling unit.

More specifically, the conveyor device 1 comprises a first 2 and a second rotating axis 3 around which a conveyor belt 4 is wrapped.

The first axis 2 is provided with at least two first pulleys 5 rotating coaxially around a first rotation axis "A".

Said first pulleys 5 are spaced apart along said first rotation axis "A" by a first distance "D1".

The second axis 3 is provided with at least two second pulleys 6 rotating coaxially around a second rotation axis "B".

Said second pulleys 6 are spaced apart along said second rotation axis "B" by a second distance "D2".

Preferably, the first "D1" and the second distance "D2" are equal to each other and substantially correspond to a width of the conveyor belt 4.

In this regard, it should be noted that each first pulley 5 is aligned with a corresponding second pulley 6 along a direction of movement "M" of the conveyor device 1.

Moreover, preferably, the first rotation axis "A" is, in use, at the same height (i.e., the height with respect to a supporting surface) as the second rotation axis "B".

Therefore, advantageously, the conveyor belt 4 has a substantially horizontal direction of movement "M".

It should be noted that the pulleys of each first 2 or second axis 3 could also be more than two, depending on the type and size of the conveyor device 1.

The conveyor belt 4 extends between the first "A" and the second axis "B" and is (partially) wrapped around said first 5 and second pulleys 6.

According to one aspect of the present invention, the conveyor belt 4 comprises a substantially flat base body 7 extending between the two axes 2, 3, and movable back and forth around them.

Therefore, the conveyor belt 4, in use, has an upper transport section 11a and a lower return section 11b.

Preferably, the base body 7 is made of rubberized cloth and has a first face 7a, inner in use, and a second face 7b, outer in use.

The term "rubberized cloth" is used herein to define an element consisting essentially of a cloth or fabric coated, on one or both faces, with a rubber layer.

In other words, the base body has a core made of mesh fabric, preferably of a material suitable for supporting heavy loads such as, for example, nylon, polyester, polyamide fibres, or other material.

Whereas the coating is made, preferably but not necessarily on both faces, of a rubber, preferably a styrene-butadiene copolymer (or SBR rubber).

In the preferred embodiment, the coating is asymmetrical, i.e., greater (thicker) at the second (outer) face 7b, whereas on the first face 7a it is thinner (if present), enough to leave the fabric mesh visible and sensitive to the touch.

Advantageously, in this way, it is possible to guarantee excellent friction and mechanical strength characteristics without adversely affecting the weight of the belt, which is extremely advantageous both in terms of mechanical performance and cost.

Therefore, the base body 7 extends along the (longitudinal) movement direction and is transversely delimited by two lateral sides 7c.

Therefore, the distance between the two lateral sides 7c corresponds to a width of the conveyor belt 4.

Preferably, therefore, the base body 7 comprises a support central zone 10a extending along the direction of movement "M" and interposed between two traction lateral zones 10b.

The two lateral zones 10b are therefore adjacent to (and externally delimited by) the lateral sides 7c of the base body 7. The central 10a and lateral zones 10b are made in one piece (i.e., in a single piece).

In a first embodiment, the conveyor belt 4 (in particular the base body 7) is of the modular type and comprises a plurality of modules 8 arranged in series and joined at respective end edges 8a.

Advantageously, this allows the length of the conveyor belt 4 to be changed at will by modifying the number of modules 8.

Each module 8 therefore extends in a planar manner and is peripherally delimited by the two end edges 8a and by two lateral edges 8b, defining respective portions of the lateral sides 7c of the base body 7.

At the end edges 8a, the modules 8 are connected to each other through suitable joints.

Alternatively, as shown in FIG. 3, the conveyor belt 4 (in particular the base body 7) could be substantially monolithic, i.e., defined by a single band of material extending between two ends joined together to define the annular (or closed) path of the belt.

In this regard, it should be noted that the two ends of the base body 7 are preferably joined together by a pair of hinges 20 at the lateral zones 10b and with a plurality of point joints 21 within the central zone 10a.

According to one aspect of the invention, at least one lateral zone 10b comprises at least one traction body 19, which is made in one piece with the respective lateral zone 10b, projects from said first face 7a and can be coupled to a first pulley 5 and to the respective second pulley 6 for moving the conveyor belt 4.

The term "traction body 19" is used herein to refer to any element which can be coupled to the pulleys to transmit traction/movement to the belt.

Preferably, both lateral zones 10b comprise a respective traction body 19.

Preferably, the traction body 19 of at least one lateral zone 10b comprises a plurality of teeth 9 made in one piece with the lateral zone 10b.

More preferably, said teeth 9 are vulcanized to the base body 7.

Hence, the traction body 19 of at least one lateral zone 10b is preferably defined by a succession of teeth 9 projecting from the first face 7a and arranged along the respective lateral side 7c, so as to engage a first pulley 5 and the respective second pulley 6.

More preferably, the traction body 19 of the other lateral zone 10b is also defined by a succession of teeth 9 projecting from the first face 7a and arranged along the respective lateral side 7c, so as to engage the other first pulley 5 and the respective second pulley 6.

Preferably, therefore, along the lateral sides 7c of the base body there are two rows of teeth 9 aligned with each other along the movement direction "M".

Advantageously, this increases the traction and makes the system more reliable.

Alternatively, the base body 7 (or the conveyor belt 4) could comprise a succession of teeth 9 at one lateral zone 10b without any further traction body projecting from the other; in this case, the "second" lateral zone 10b would be moved by friction by a pair of non-grooved pulleys.

Each row has an orderly succession of teeth 9 spaced by a constant distance.

More preferably, each tooth 9 in one row is aligned, orthogonally to the direction of movement, with one tooth 9 in the other row.

Advantageously, this allows the pulleys 5, 6 to keep a balanced traction on the conveyor belt 4.

In this regard, it should be noted that the first 5 and/or second pulleys 6, in turn, have a plurality of teeth (or grooves) shaped to receive the teeth 9 of the conveyor belt 4 and to exert traction thereon.

In the preferred embodiment, the first pulleys 5 are toothed so as to engage the traction body 19 of the conveyor belt 4.

In this embodiment, instead, the second pulleys 6 are grooved, provided with a circumferential groove 6a in which the teeth 9 of the conveyor belt 4 are housed.

Preferably, the distance "pt" existing between two successive teeth 9 is comprised between 20 and 60 mm, more preferably between 25 and 35 mm. In the illustrated embodiment, this distance is approximately 31 mm.

Furthermore, the teeth preferably have a height less than the width, where "height" refers to the dimension of the tooth 9 calculated moving away from the first face 7a of the base body 7, and "width" refers to the dimension of the tooth 9 calculated parallel to the rotation axes "A", "B" of the first 2 and the second axis 3.

Advantageously, in this way, the shear stress given by the traction is well distributed and the bending moment generated at the base of the tooth is reduced.

Moreover, in order to ensure maximum strength, the depth of the tooth 9, i.e., the dimension thereof calculated along the direction of movement, is also greater than the height, although smaller than the width, so as not to adversely affect the flexibility of the belt.

Preferably, the ratio between the height and the width of the tooth 9 is comprised between 1/20 and 1/5, more preferably approximately 1/12, where the term "approximately" is understood herein as a tolerance of ±15%.

Preferably, moreover, the ratio between the height and the depth of the tooth 9 is comprised between 1 and 0.2, more preferably approximately 0.5, where the term "approximately" is understood herein as a tolerance of ±15%.

Preferably, it should be noted that the central zone 10a of the base body 7 has a reduced thickness with respect to the lateral zones 10b. In other words, the central zone 10a has a first thickness "s1" and the lateral zones 10b have a second thickness "s2", which is greater than the first thickness "s1".

In this regard, it should be noted that while the lateral zones 10b are made of rubberized cloth, the central zone 10a could also be made solely of rubber, to the full advantage of the manufacturing costs of the conveyor belt 4.

Preferably, in any case, both the lateral zones 10b and the central zone 10a are made of rubberized cloth.

Preferably, the lateral zones 10b have a layer of polyurethane (or rubber) coating that is thicker, albeit slightly, than the central zone 10a, therefore being thicker than the central zone 10a by a quantity less than or equal to 15%.

As said, the traction body is made in one piece, preferably by vulcanization, with the respective lateral zone 10b, so as to ensure maximum tensile strength.

On the contrary, the central zone 10a is lighter, therefore less expensive and stressful for the structure.

In this regard, in order to ensure greater sealing, the lateral zones 10b, during the vulcanization step, are subjected to a tensile preload (i.e., along the movement direction "M"), preferably equal to or greater than 450N, more preferably equal to or greater than 950N, even more preferably equal to the working tension (in the embodiment approximately 1000N).

Each lateral zone 10b therefore has a width equal to or greater than that of the teeth 9 (or the traction body) projecting therefrom.

Preferably, the lateral zones 10b have a width greater than the traction body 19 (in particular than the teeth 9), extending further with respect thereto towards a longitudinal center line (parallel to the direction of movement "M") of the base body 7.

In other words, the traction body 19 shares with the respective lateral zone 10b an outer lateral edge (corresponding to the lateral side 7c) but has an inner lateral edge distal from the longitudinal center line with respect to the inner lateral edge of the lateral zone 10b.

In the preferred embodiment, the lateral zone 10b has a width at least 1.5 times that of the respective traction body 19, greater than or equal to about 2 times its width.

Preferably, it should be noted that the conveyor device 1 comprises at least one longitudinal guide 12 extending along the movement direction "M" and designed to support the transport section 11a of the conveyor belt 4 during movement.

In the preferred embodiment, the conveyor device 1 comprises at least two longitudinal guides 12 extending along the movement direction "M" and designed to support the transport section 11a of the conveyor belt 4 during movement.

The longitudinal guides 11 therefore face the first face 7a of the base body 7, at the lateral zones 10b when they are in the transport section 11a.

Preferably, therefore, when in the transport section 11a, each lateral zone 10b is partly slidably joined to a respective longitudinal guide 12.

In greater detail, each lateral zone preferably has a resistant (or traction) band 13a proximal to the lateral side 7c and where the traction body 19 is located, and a sliding (or tensioning) band 13b distal from the lateral side 7c and slidingly joined to the respective longitudinal guide 12 (when it is in the transport section 11a).

Advantageously, in this way, a single lateral zone 10b is used for both its peculiarities, that is to provide greater tensile strength (resistant band 13a) and greater wear resistance (sliding band 13b) compared to the central zone 10a of the base body 7.

Preferably, moreover, with reference to the embodiment shown in FIGS. 10a to 12a, at least the first pulleys 5 have a transversal extension, i.e., a width, greater than the resistant band 13a.

In this embodiment, each first pulley 5 has a plurality of teeth 5a having a width greater than that of the resistant band 13a, so as to also contact the sliding band 13b and ensure tensioning.

Figure 10A:
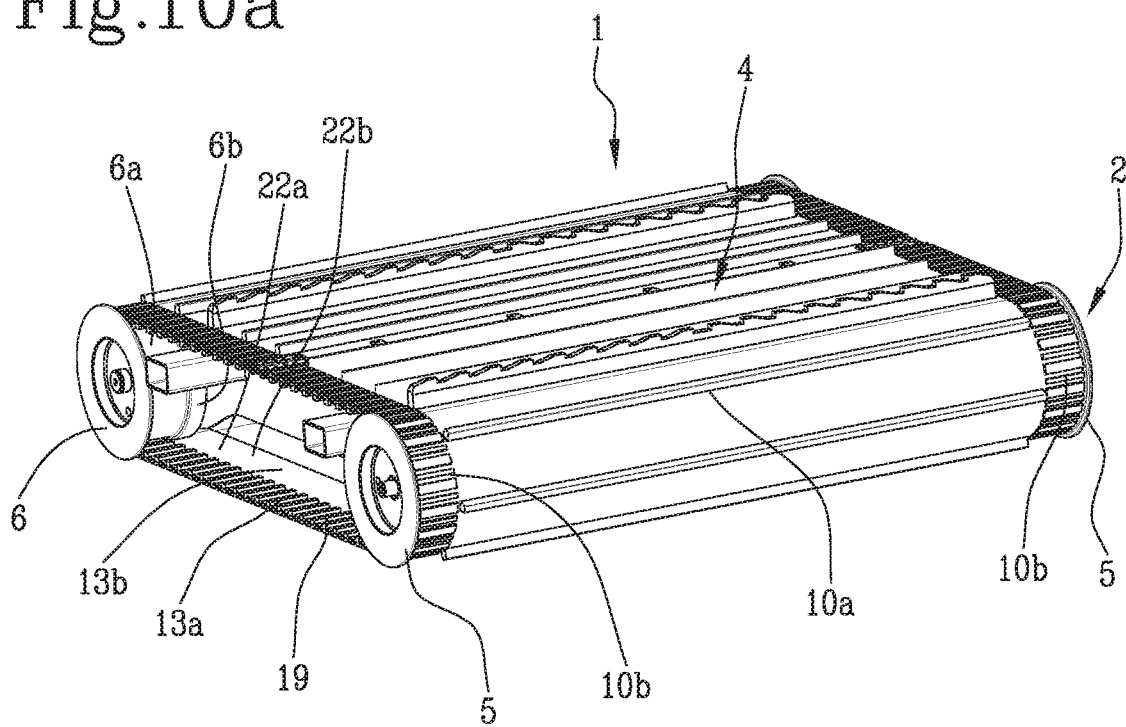
FIGS. 10a and 10b show respective top and bottom perspective views of the conveyor device according to a variant of the present invention.
Figure 10B:
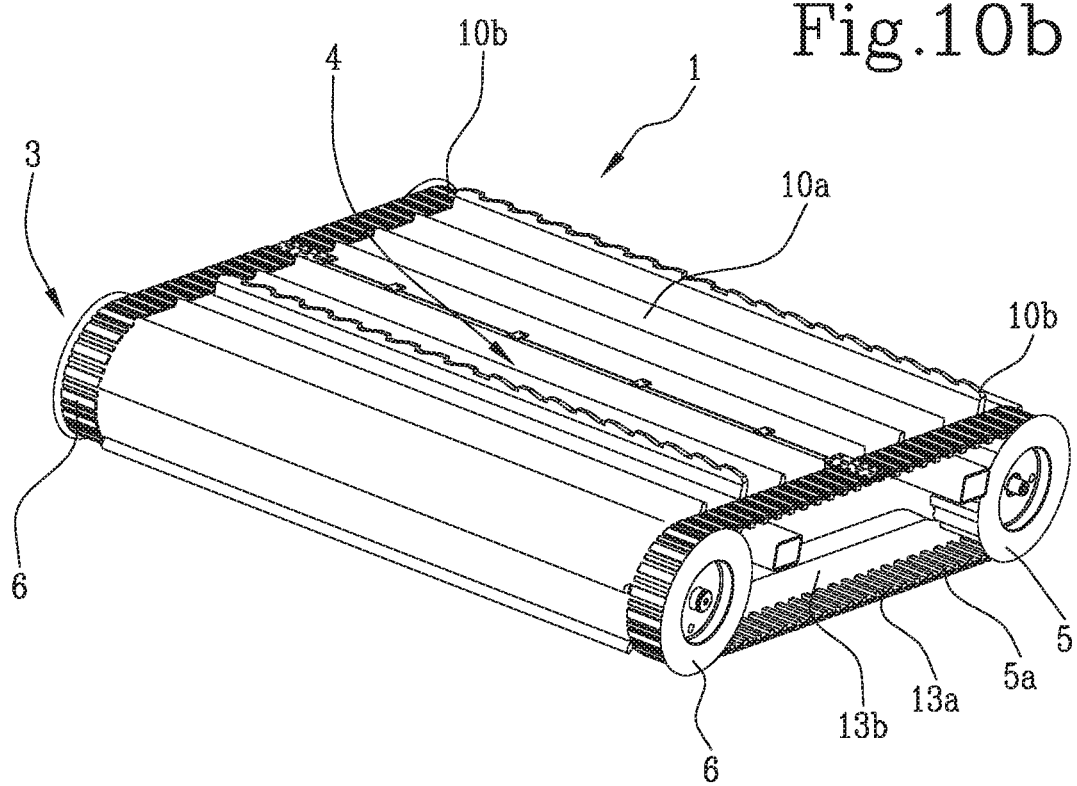

More preferably, as shown in FIG. 10b, the second pulleys 6 are instead of the grooved type, i.e., they have the circumferential groove 6a described above and located at the resistant band 13a of the belt 4.

In the preferred embodiment, said second pulleys 6 also have a tensioning portion 6b having a diameter larger than the groove 6a and placed in contact with a respective sliding band 13b, so as to further increase the tensioning.

In this regard, therefore, each sliding band has:
a tensioning section 22a distal from the center line and coupled with the tensioning portion 6b of a respective second pulley 6 and/or with the teeth 5a of a first pulley 5;
a sliding section 22b proximal to the center line and slidingly associated with a longitudinal guide 12.

According to a further aspect of the present invention, complementary or alternative to those described heretofore, the conveyor belt 4 further comprises a plurality of cross bars 14.

Said cross bars 14 extend transversely to said movement direction "M" between the lateral zones 10b (i.e., between the lateral sides 7c).

Preferably, the cross bars 14 are orthogonal to the movement direction "M" and parallel to the rotation axes "A", "B" of the first 2 and the second axis 3.

Advantageously, the presence of cross bars makes it possible to stiffen the conveyor belt 4, allowing the traction body 19 to remain guided within the pulleys 5, 6.

In this regard, the cross bars 14 are spaced apart along the movement direction "M" by a predetermined (and constant) distance "p".

Preferably, this distance "p" is less than or equal to $2/3\pi (d/2)$, wherein "d" corresponds to the smaller diameter of the first 5 and second pulleys 6, which however is preferably the same.

Advantageously, in this way, at least two cross bars 14 are arranged along the arc of the pulley 5, 6 in contact with the conveyor belt 4.

In the preferred embodiment, the cross bars are placed at a distance "p" comprised between 60 and 130 mm, preferably between 80 and 100 mm.

It should also be noted that the cross bars 14 have a transversal extension which is less than or equal to the base body 7, i.e., less than the distance between the two lateral sides 7c.

More precisely, the cross bars 14 have a transversal extension at least equal to the distance between the lateral zones 10b.

Preferably, the cross bars 14 project (or rise) from the second face 7b of the base body 7, i.e., from the outer face of the conveyor belt 4.

Preferably, the plurality of cross bars 14 comprises a plurality of stiffening bars 15 and a plurality of transport bars 16.

The stiffening bars 15 have a lesser thickness than the transport bars 16, where "thickness", in this case too, indicates the dimension calculated moving away from the second face 7b of the base body 7.

In the preferred embodiments, the thickness of the transport bars 16 is at least twice that of the stiffening bars 15, more preferably about three times the thickness.

In greater detail, the thickness of the stiffening bars 15 is preferably between 10 and 15 mm.

The thickness of the transport bars 16, on the other hand, is between 30 and 40 mm.

Preferably, the stiffening bars 15 are greater in number than the transport bars 16.

In the preferred embodiment, the ratio between the number of stiffening bars 15 and the number of transport bars 16 is at least 2, more preferably at least 4.

In greater detail, in the illustrated embodiment, the distribution of the cross bars 14 provides one transport bar 16 each four stiffening bars 15, all of which are spaced apart by the distance "p" described above.

Preferably, the transport bars 16 have a free end edge 16a (distal from the second face 7b), sawtooth shaped or notched.

More preferably, said free end edge 16a has a sawtooth profile; this profile is divided into two half-parts having opposite orientation, moving away from each other.

Advantageously, in this way, the material arriving transversely to the belt is "invited" to surmount the conveyor belt 4 in the first half-part, on the contrary, it is retained on the belt in the second half-part.

According to one aspect of the invention, complementary or alternative to the preceding ones, the cross bars 14 are made in one piece with the base body 7, preferably vulcanized thereto.

In the preferred embodiment, the cross bars 14 (at least the stiffening bars 15) comprise a reinforcement core (not shown) embedded in a vulcanized rubber coating on the second face 7b of the base body 7 of the conveyor belt 4.

The core is therefore made of a material capable of giving transversal stiffness to the bar, for example, a metal material (such as steel, or the like) or, preferably, a composite material such as, for example, glass fibre.

Advantageously, thanks to this structure, it is not necessary to mechanically connect the cross bars to the belt, favouring the lightness and reliability of the product.

Preferably, moreover, on the second face of the base body 7, at the lateral sides 7c, there are a plurality of transverse ribs 17a, 17b arranged in longitudinal succession, preferably at a constant distance.

In the preferred embodiment, said ribs comprise first ribs 17a and second ribs 17b alternating with each other along the movement direction "M", wherein each first rib 17a is arranged at a tooth 9 and protrudes from the opposite face of the base body 7.

Each second rib 17b is interposed between two first ribs 17a, equidistant therefrom.

Preferably, the first ribs 17a have a thickness equal to that of the second ribs 17b, but a greater depth (equal to that of the teeth 9).

In any case, the ribs 17a, 17b are less thick than the cross bars 14.

This advantageously further increases the strength of the teeth 9.

It should be noted that the ribs are less thick than the cross bars, and more preferably also than the teeth 9.

According to a further aspect of the invention, however, the device comprises an idler unit 18 associated with the return section 11b of the conveyor belt 4.

This idler unit 18 is configured to divert the path of the return section 11b close to the pulleys 5, 6, in order to reduce the distance between the return section 11b and the transport section 11a to a value lower than the diameter of the pulleys 5, 6.

Preferably, the idler unit 18 comprises a plurality of rollers/idlers around which the second face 7b of the base body 7 is wound, in particular at the lateral zones 10b.

These rollers/idlers are located at a distance from the transport section 11a smaller than the diameter of the pulleys, so as to reduce the overall dimensions of the conveyor device 1 inside the machinery 100.

In fact, as already discussed, it should be noted that the conveyor device 1 object of the invention has its preferred (and main) application within a handling and/or unloading system 101 of agricultural machinery 100, area in which the technical advantages related to the invention find their maximum realization.

The agricultural machinery 100, preferably of the type for harvesting agricultural products, comprises a frame 102 with which the handling and/or unloading system 101 equipped with the conveyor device 1 is associated.

In the preferred embodiment, the frame of the agricultural machinery 100 comprises rolling (or sliding) movement means configured to allow the frame 1 to be driven along a direction of travel.

Collection means 103 are also provided at the front of the frame 101, which are configured to collect agricultural products from the ground, preferably by means of tines or tongs distributed orthogonally to the direction of travel and rotating continuously.

The handling and/or unloading system 101 is operatively positioned downstream of the collection means 103 and comprises the conveyor device 1 and a member for actuating the same (not shown).

Preferably, the conveyor belt 4 extends horizontally and orthogonally to the direction of travel, substantially along the entire transversal extension of the collection means 103, so as to receive the collected agricultural products and transfer them to a suitable unloading area located near the first 2 or second axis 3.

The invention achieves the intended objects and attains important advantages.

In fact, the provision of a conveyor device with a rubberized fabric belt equipped with integrated lateral teeth allows the advantages of the rubber belt to be combined with those of the pulley handling system.

Moreover, the use of cross bars distributed at a suitable distance and having a reinforcement core allows the strength of the belt to be maximized without adversely affecting either the assembly or the weight thereof.

The invention claimed is:

1. A conveyor device, comprising:
a first axis including at least two first pulleys rotating coaxially around a first rotation axis and spaced apart along said first rotation axis by a first distance;
a second axis including at least two second pulleys coaxially rotating around a second rotation axis and spaced apart along said second rotation axis by a second distance, wherein each of the at least two first pulleys is aligned with a corresponding one of the at least two second pulleys along a movement direction of the conveyor device;
a conveyor belt extending between said first and second axis and wrapped around said at least two first pulleys and said at least two second pulleys;

at least one pair of longitudinal guides extending along the movement direction and supporting a transport section of the conveyor belt during movement;
wherein said conveyor belt comprises:
a substantially flat base body made at least in part of rubberized cloth and having a first face, inner in use, and a second face, outer in use; said base body comprising a support central zone, extending along the movement direction and interposed between two traction lateral zones, wherein said lateral zones comprise at least one traction body made in one piece with a respective one of the lateral zones and comprise a plurality of teeth projecting from the first face and arranged in succession along the base body to engage one of the at least two first pulleys and a respective one of the at least two second pulleys, for moving the conveyor belt;
a plurality of cross bars extending transversely to said movement direction between said lateral zones,
wherein:
the central zone of the base body of the conveyor belt has a first thickness "s1" and the lateral zones have a second thickness "s2", which is greater than the first thickness "s1";
each of the lateral zones includes a resistant band, which is external and where the traction body is located, and a sliding band, which is internal and is slidingly joined to at least one of the longitudinal guides when in the transport section.

2. The conveyor device according to claim 1, wherein said at least two first pulleys have a first diameter, said at least two_second pulleys have a second diameter, and said cross bars are spaced apart along the movement direction by a predetermined distance "p"; said distance "p" being less than or equal to $[2/3\pi (d/2)]$, wherein "d" corresponds to a lesser of either the first diameter or the second diameter.

3. The conveyor device according to claim 1, wherein the teeth are made in one piece with the lateral zones, by vulcanization.

4. The conveyor device according to claim 1, wherein said cross bars comprise a plurality of stiffening bars, of a lesser thickness, and a plurality of transport bars, projecting from said second face and of a greater thickness.

5. The conveyor device according to claim 4, wherein the transport bars have a free end edge, distal from the second face, sawtooth shaped or notched.

6. The conveyor device according to claim 5, wherein said free end edge has a sawtooth profile divided into two half-parts having opposite orientation, moving away from each other.

7. The conveyor device according to claim 1, wherein the at least two first pulleys each have a transversal extension greater than the respective resistant band.

8. The conveyor device according to claim 7, wherein each of the at least two first pulleys has a plurality of teeth having a width greater than that of the respective resistant band, to also contact the sliding band and ensure tensioning.

9. The conveyor device according to claim 1, wherein the at least two second pulleys include:
a circumferential groove aligned with the respective resistant band of the belt along the movement direction;
a tensioning portion having a diameter larger than the groove and placed in contact with a respective sliding band.

10. The conveyor device according to claim 9, wherein each sliding band includes:

a tensioning section distal from a longitudinal center line of the conveyor belt and coupled with the tensioning portion of a respective one of the at least two second pulleys and/or with the teeth of one of the at least two first pulleys;
a sliding section proximal to said center line and slidingly engaged with a longitudinal guide.

11. The conveyor device according to claim 1, wherein said cross bars comprise a reinforcement core embedded in a vulcanized rubber coating on the second face of the conveyor belt.

12. Agricultural machinery for harvesting and/or moving agricultural products, comprising:
a frame provided with rolling or sliding elements designed to enable the agricultural machinery to move in one direction of travel;
a conveyor device comprising:
a first axis including at least two first pulleys rotating coaxially around a first rotation axis and spaced apart along said first rotation axis by a first distance;
a second axis including at least two second pulleys coaxially rotating around a second rotation axis and spaced apart along said second rotation axis by a second distance, wherein each of the at least two first pulleys is aligned with a corresponding one of the at least two second pulleys along a movement direction of the conveyor device;
a conveyor belt extending between said first and second axis and wrapped around said at least two first pulleys and said at least two second pulleys;
at least one pair of longitudinal guides extending along the movement direction and supporting a transport section of the conveyor belt during movement;
wherein said conveyor belt comprises:
a substantially flat base body made at least in part of rubberized cloth and having a first face, inner in use, and a second face, outer in use; said base body comprising a support central zone, extending along the movement direction and interposed between two traction lateral zones, wherein said lateral zones comprise at least one traction body made in one piece with a respective one of the lateral zones and comprise a plurality of teeth projecting from the first face and arranged in succession along the base body to engage one of the at least two first pulleys and a respective one of the at least two second pulleys, for moving the conveyor belt;
a plurality of cross bars extending transversely to said movement direction between said lateral zones,
wherein:
the central zone of the base body of the conveyor belt has a first thickness "s1" and the lateral zones have a second thickness "s2", which is greater than the first thickness "s1";
each of the lateral zones includes a resistant band, which is external and where the traction body is located, and a sliding band, which is internal and is slidingly joined to at least one of the longitudinal guides when in the transport section;
the conveyor device joined to said frame and including an actuating device configured to rotate said first and/or said second axis.

* * * * *